(12) United States Patent
Hall et al.

(10) Patent No.: US 12,549,514 B2
(45) Date of Patent: Feb. 10, 2026

(54) USER EQUIPMENT CACHE MODIFICATION FOR EDGE COMPUTING

(71) Applicant: QUALCOMM Incorporated, San Diego, CA (US)

(72) Inventors: Edward Robert Hall, Bristol (GB); Dario Serafino Tonesi, San Diego, CA (US); Sunghoon Kim, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/044,751

(22) PCT Filed: Jul. 26, 2021

(86) PCT No.: PCT/US2021/070950
§ 371 (c)(1),
(2) Date: Mar. 9, 2023

(87) PCT Pub. No.: WO2022/099229
PCT Pub. Date: May 12, 2022

(65) Prior Publication Data
US 2023/0362129 A1 Nov. 9, 2023

(30) Foreign Application Priority Data

Nov. 9, 2020 (GR) .............................. 20200100673

(51) Int. Cl.
*H04L 61/58* (2022.01)
*H04L 61/4511* (2022.01)

(52) U.S. Cl.
CPC .......... *H04L 61/58* (2022.05); *H04L 61/4511* (2022.05)

(58) Field of Classification Search
CPC .............................. H04L 61/58; H04L 61/4511
See application file for complete search history.

(56) References Cited

U.S. PATENT DOCUMENTS

| | | | |
|---|---|---|---|
| 2008/0215735 A1* | 9/2008 | Farber | H04L 61/4511 707/E17.119 |
| 2011/0202793 A1* | 8/2011 | Xu | H04L 61/4511 714/48 |

(Continued)

FOREIGN PATENT DOCUMENTS

| | | |
|---|---|---|
| CN | 109788078 A | 5/2019 |
| CN | 111836319 A | 10/2020 |

(Continued)

OTHER PUBLICATIONS

Stefano Ferretti, A survey on handover management in mobility architectures, Jan. 15, 2016, ScienceDirect, vol. 94, p. 390-413, URL retrieved via: https://www.sciencedirect.com/science/article/pii/S1389128615004491 (Year: 2016).*

(Continued)

*Primary Examiner* — Schquita D Goodwin
(74) *Attorney, Agent, or Firm* — Harrity & Harrity, LLP

(57) ABSTRACT

Various aspects of the present disclosure generally relate to wireless communication. In some aspects, a user equipment (UE) may store, in a domain name system (DNS) cache, DNS information associated with an edge application server at which an application context, associated with an application client resident on the UE, is located. The UE may receive a first message associated with a handover of the UE or a second message associated with a transfer of the application context. The UE may modify the DNS cache, by updating the DNS information or flushing the DNS information, based at least in part on receiving the first message or the second message. Numerous other aspects are provided.

30 Claims, 6 Drawing Sheets

(56) References Cited

U.S. PATENT DOCUMENTS

| | | | |
|---|---|---|---|
| 2017/0126618 A1* | 5/2017 | Bhaskaran | H04L 61/5014 |
| 2017/0127324 A1* | 5/2017 | Liang | H04W 8/18 |
| 2018/0375716 A1* | 12/2018 | Huque | H04L 61/4511 |
| 2020/0092717 A1* | 3/2020 | Kim | H04W 64/00 |
| 2020/0213265 A1* | 7/2020 | Deshpande | H04L 61/58 |
| 2020/0252367 A1* | 8/2020 | Yang | H04L 61/58 |
| 2020/0287933 A1* | 9/2020 | Buck | H04L 61/4511 |
| 2020/0367090 A1* | 11/2020 | Zhang | H04W 76/27 |
| 2021/0226914 A1* | 7/2021 | Shan | H04L 61/4511 |
| 2022/0174033 A1* | 6/2022 | Ke | H04L 61/5038 |
| 2022/0200847 A1* | 6/2022 | Bartolome Rodrigo | H04L 67/51 |
| 2022/0278955 A1* | 9/2022 | Roy | H04L 61/4511 |
| 2022/0345442 A1* | 10/2022 | Lee | H04L 67/51 |
| 2023/0156094 A1* | 5/2023 | Hergenhan | H04W 76/12 709/227 |
| 2023/0239958 A1* | 7/2023 | Li | H04L 45/74 370/328 |

FOREIGN PATENT DOCUMENTS

| | | |
|---|---|---|
| EP | 3694187 A1 | 8/2020 |
| WO | WO-2012107788 A1 | 8/2012 |

OTHER PUBLICATIONS

Changhong Shan, U.S. Appl. No. 63/006,899, filed Apr. 8, 2020, p. 19 (Year: 2020).*

Huawei, et al., "Discussion on SA2 Edge Computing Study", 3GPP Draft, S2-1901832 Discussion on Enhancement of Support—For EC in 5GC V1.5, 3rd Generation Artnership Project (3GPP), Mobile Competence Centre, 650, Route Des Lucioles, F-06921 Sophia-Antipolis, Feb. 19, 2019 (Feb. 19, 2019), 13 Pages, XP051610423, p. 5.

Huawei, et al., "Pseudo-CR on Solution to Edge Application Server Discover and Update", 3GPP TSG-SA WG6 Meeting #33, 3GPP Draft, S6-191956—WAS1885WAS1723—Solution to EDGE Application Server Discover and Update, 3rd Generation Partnership Project (3GPP), Mobile Competence Centre, 650, Route Des Lucioles, F-0692, vol. SA WG6, No. Sophia Antipolis, France, Sep. 2, 2019-Sep. 6, 2019, Sep. 8, 2019 (Sep. 8, 2019), 5 Pages, XP051780031, paragraph [7.x.1].

Huawei, et al., "UE DNS Cache Flush", 3GPP TSG SA2 Meeting #136AH, 3GPP Draft, S2-2000373, 3rd Generation Partnership Project (3GPP), Mobile Competence Centre, 650, Route Des Lucioles, F-06921 Sophia-Antipolis Cedex, France, vol. SA WG2, No. Incheon, South Korea, Jan. 13, 2020-Jan. 17, 20200117, pp. 1-3, Jan. 7, 2020 (Jan. 7, 2020), XP051842446, paragraphs [0001], [6.x.2].

International Search Report and Written Opinion—PCT/US2021/070950—ISA/EPO—Oct. 13, 2021.

Cheshire S (Apple Inc)., et al., "Apple's DNS Long-Lived Queries Protocol rfc8764.txt", RFC8764.TXT, Internet Engineering Task Force, IETF, Standard, Internet Society (ISOC) 4, Rue Des Falaises CH—1205 Geneva, Switzerland , Jun. 23, 2020, 12 pages, XP015139670.

Pusateri T (Apple Inc)., et al., "DNS Push Notifications; rfc8765.txt", RFC8765.TXT, Internet Engineering Task Force, IETF, Standard, Internet Society ISOC) 4, Rue Des Falaises CH—1205 Geneva, Switzerland , Jun. 23, 2020, 21 pages , XP015139671.

Cheshire S., et al., "Apple's DNS Long-Lived Queries Protocol", Informational, Jun. 1, 2020, pp. 1-20.

* cited by examiner

USER EQUIPMENT CACHE MODIFICATION FOR EDGE COMPUTING

CROSS-REFERENCE TO RELATED APPLICATIONS

This Patent Application is a 371 national stage of PCT Application No. PCT/US2021/070950 filed on Jul. 26, 2021, entitled "USER EQUIPMENT CACHE MODIFICATION FOR EDGE COMPUTING," which claims priority to Greece Patent Application No. 20200100673, filed on Nov. 9, 2020, entitled "USER EQUIPMENT CACHE MODIFICATION FOR EDGE COMPUTING," and assigned to the assignee hereof. The disclosure of the prior Application are considered part of and are incorporated by reference into this Patent Application.

FIELD OF THE DISCLOSURE

Aspects of the present disclosure generally relate to wireless communication and to techniques and apparatuses for user equipment (UE) cache modification for edge computing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes storing, in a domain name system (DNS) cache, DNS information associated with an edge application server at which an application context, associated with an application client resident on the UE, is located; receiving a first message associated with a handover of the UE or a second message associated with a transfer of the application context; and modifying the DNS cache, by updating the DNS information or flushing the DNS information, based at least in part on receiving the first message or the second message.

In some aspects, a UE for wireless communication includes a memory and one or more processors operatively coupled to the memory, the memory and the one or more processors configured to: store, in a DNS cache, DNS information associated with an edge application server at which an application context, associated with an application client resident on the UE, is located; receive a first message associated with a handover of the UE or a second message associated with a transfer of the application context; and modify the DNS cache, by updating the DNS information or flushing the DNS information, based at least in part on receiving the first message or the second message.

In some aspects, a non-transitory computer-readable medium storing a set of instructions for wireless communication includes one or more instructions that, when executed by one or more processors of a UE, cause the UE to: store, in a DNS cache, DNS information associated with an edge application server at which an application context, associated with an application client resident on the UE, is located; receive a first message associated with a handover of the UE or a second message associated with a transfer of the application context; and modify the DNS cache, by updating the DNS information or flushing the DNS information, based at least in part on receiving the first message or the second message.

In some aspects, an apparatus for wireless communication includes means for storing, in a DNS cache, DNS information associated with an edge application server at which an application context, associated with an application client resident on the apparatus, is located; means for receiving a first message associated with a handover of the apparatus or a second message associated with a transfer of the application context; and means for modifying the DNS cache, by updating the DNS information or flushing the DNS information, based at least in part on receiving the first message or the second message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antennas, radio frequency (RF)-chains, power amplifiers, modulators, buffers, processor(s), interleavers, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
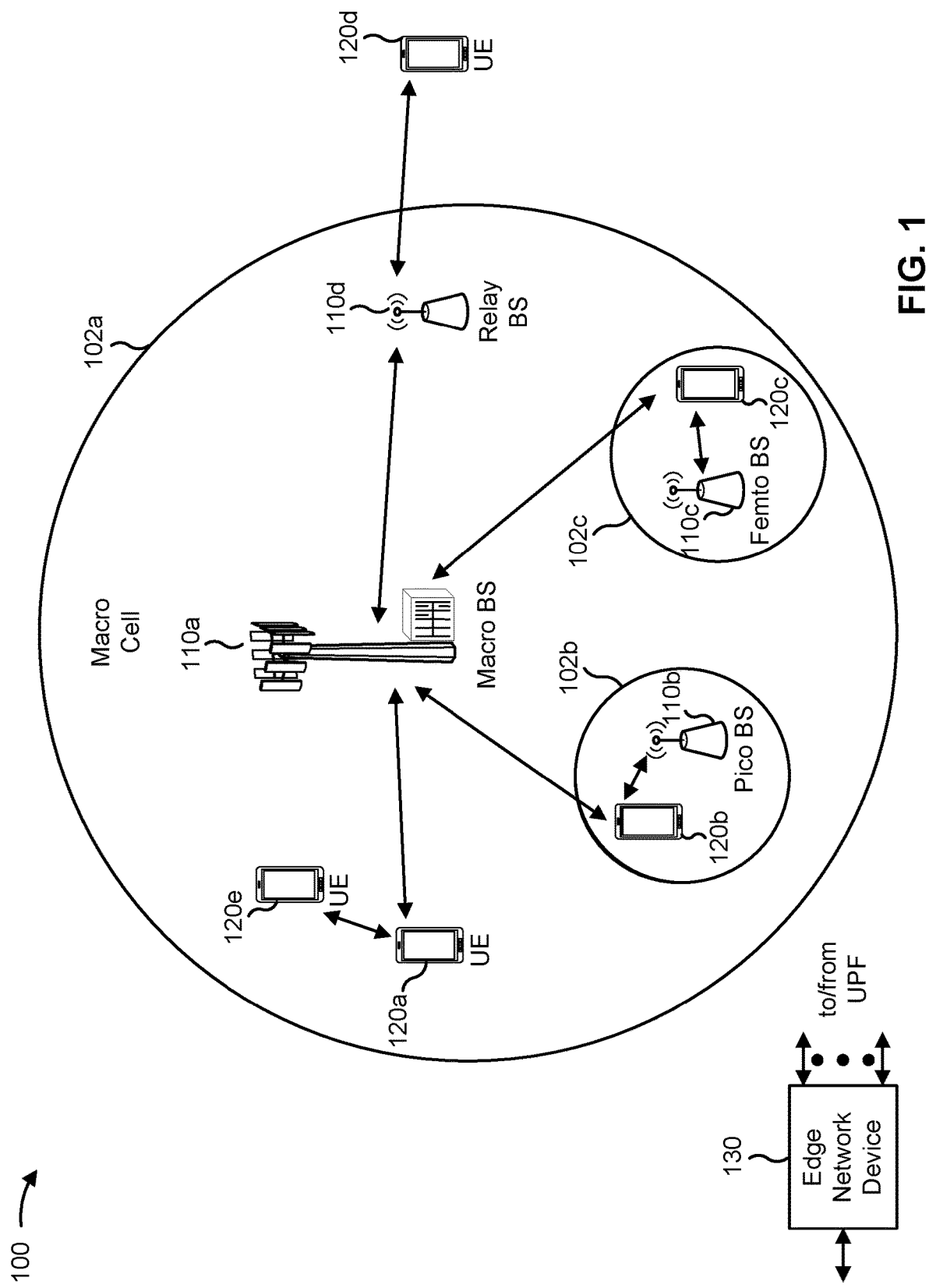
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller may couple to a set of BSs and may provide coordination and control for these BSs. The network controller may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, UE 120 may communicate with an edge network device 130 of an edge network. Edge network device 130 may offload processing of UE 120 and help UE 120 to conserve power and perform other functions. UE 120 may communicate with edge network device 130 via BS 110 and a user plane function (UPF). Edge network device 130 may communicate with a core network or a cloud computing network.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
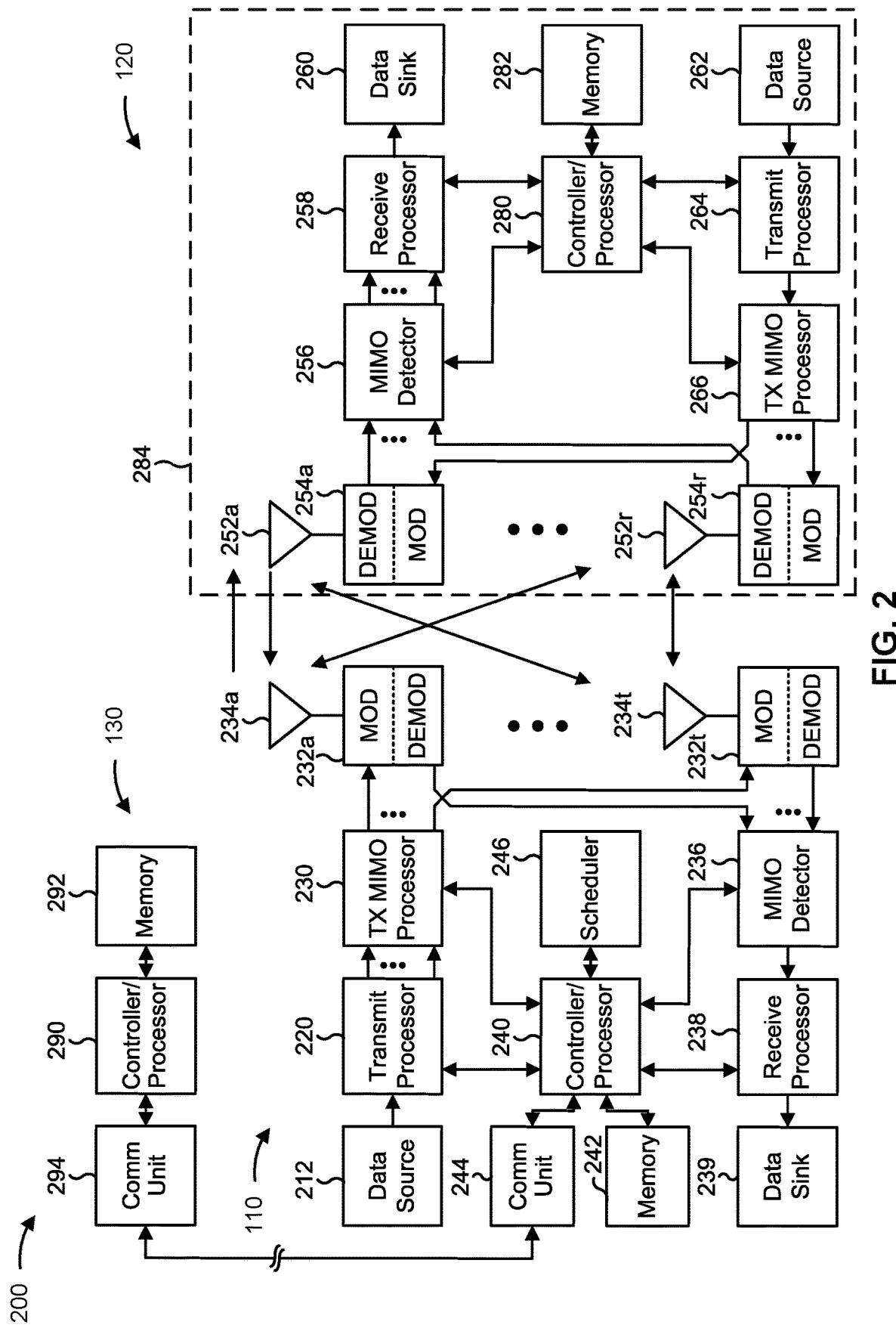
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to a network controller via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-5).

Edge network device 130 may include communication unit 294, controller/processor 290, and memory 292. The edge network device 130 may use communication unit 294, controller/processor 290, and/or memory 29 to perform aspects of any of the methods described herein, for example, as described with reference to FIGS. 4-5.

Controller/processor 240 of base station 110, controller/processor 280 of UE 120, controller/processor 290 of edge network device 130, and/or any other component(s) of FIG. 2 may perform one or more techniques associated with UE cache modification for edge computing, as described in more detail elsewhere herein. For example, controller/processor 240 of base station 110, controller/processor 280 of UE 120, controller/processor 290 of edge network device 130, and/or any other component(s) of FIG. 2 may perform or direct operations of, for example, process 500 of FIG. 5, and/or other processes as described herein. Memories 242, 282, and 292 may store data and program codes for base station 110, UE 120, and edge network device 130, respectively. In some aspects, memory 242, memory 282, and/or memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the UE 120, and/or the edge network device 130, may cause the one or more processors, the base station 110, the UE 120, and/or the edge network device 130 to perform or direct operations of, for example, process 500 of FIG. 5, and/or other processes as described herein. In some aspects, executing instructions may include running the instructions, converting the instructions, compiling the instructions, and/or interpreting the instructions, among other examples.

In some aspects, the UE includes means for storing, in a domain name system (DNS) cache, DNS information associated with an edge application server at which an application context, associated with an application client resident on the UE, is located; means for receiving a first message associated with a handover of the UE or a second message associated with a transfer of the application context; or means for modifying the DNS cache, by updating the DNS information or flushing the DNS information, based at least in part on receiving the first message or the second message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for performing a DNS based edge application server discovery procedure to obtain the DNS information associated with the edge application server.

In some aspects, the UE includes means for performing, based at least in part on flushing the DNS cache, a DNS based edge application server discovery procedure for a new edge application server at which the application context is located.

In some aspects, the UE includes means for receiving an indication of whether the UE is to flush the DNS cache in response to receiving a message associated with a handover of the UE.

In some aspects, the UE includes means for performing, in response to receiving the second message, an edge application server discovery procedure to obtain an address of a new edge application server at which the application context is located.

In some aspects, the UE includes means for updating the DNS information in the DNS cache using the address of the new edge application server.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
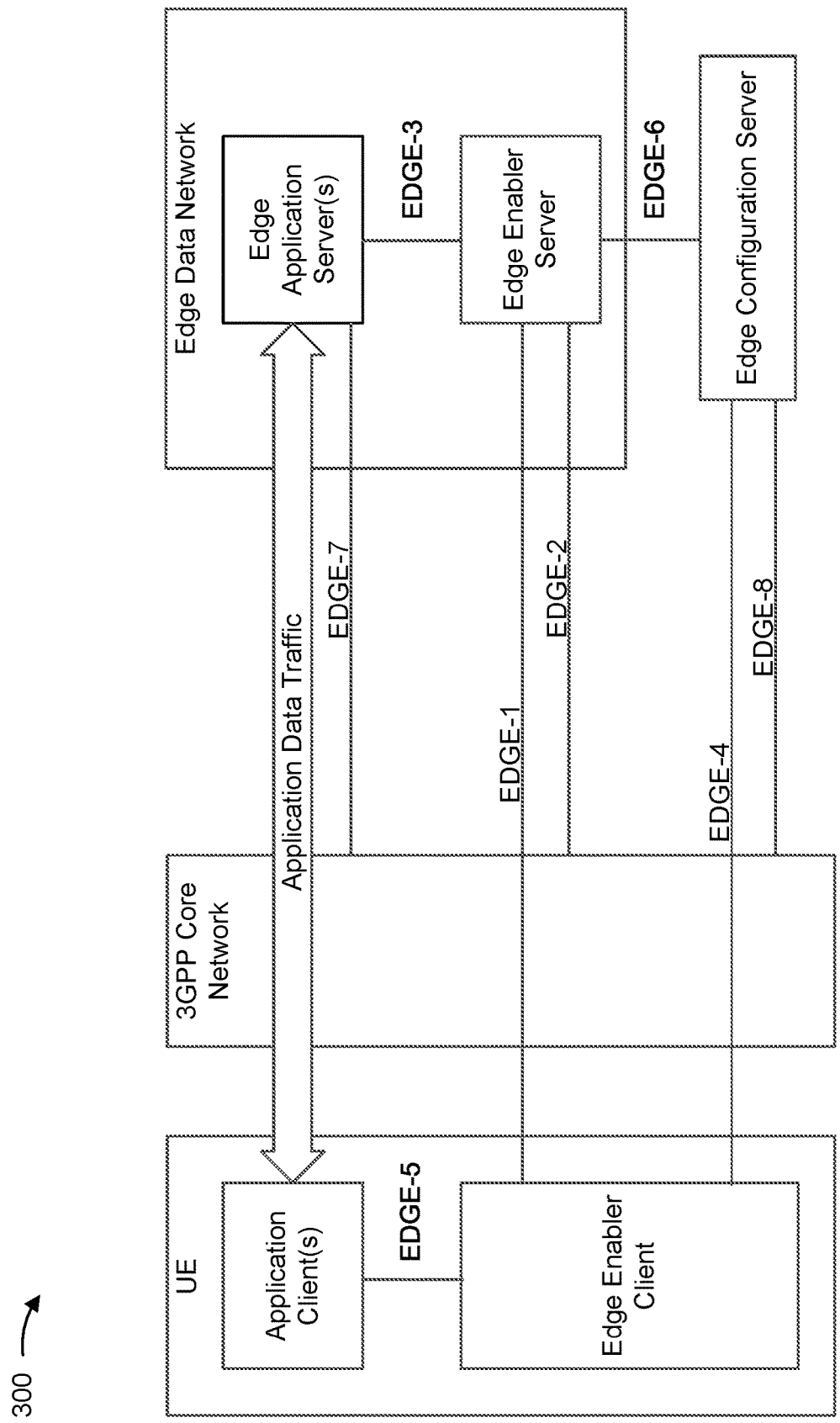
FIG. 3 is a diagram illustrating an example of edge computing, in accordance with the present disclosure.

FIG. 3 is a diagram illustrating an example 300 of edge computing, in accordance with the present disclosure. FIG. 3 shows a UE with an (edge) application client that shares application data traffic with an edge application server of an edge network device (e.g., edge network device 130) in an edge data network. FIG. 3 also shows an edge enabler client of the UE that communicates with an edge enabler server of the edge network device and an edge configuration server. Components of the UE and the edge network device may be implemented by one or more devices.

Components of the UE and the edge network device may communicate via edge messages. For example, the edge enabler client and an edge enabler server may communicate via an EDGE-1 interface; an edge enabler server and the core network may communicate via an EDGE-2 interface; an edge enabler server and an edge application server may communicate via an EDGE-3 interface, the edge enabler client and the edge configuration server may communicate via an EDGE-4 interface; an application client and the edge enabler client may communicate via an EDGE-5 interface; an edge enabler server and the edge configuration server may communicate via an EDGE-6 interface; an edge application server and the core network may communicate via an EDGE-7 interface; and the edge configuration server and the core network may communicate via an EDGE-8 interface. In some aspects, the edge enabler client and an application client of the UE may communicate via a standardized application programming interface (API) to facilitate optimized edge computing services for the UE.

Edge computing uses small, distributed local data centers to provide a resource-dense computational platform close to an originating device. In edge computing, devices and/or application clients can offload computing requests to an edge network device. Moreover, edge computing provides low latency access to high processing capabilities and data federation (e.g., aggregation of data from multiple different systems). This may be useful, for example, for IoT applications, data processing applications, and/or multimedia applications, among other examples. Accordingly, edge computing can serve a wide range of devices with on-demand applications.

Edge computing brings network devices closer to a UE in order to supplement the UE's capabilities and to enhance user services. Edge network devices, such as edge network device 130, may offload processing of the UE and help the UE to conserve power and to multi-task. When a UE is using an application, an application context (e.g., a set of information relating to the application, such as information relating to application data, application customization, a present state of the application, or the like) is created where processing for the application occurs (point of compute), and the point of compute may be in an edge network device or on the UE. More specifically, the application context connected to the application may reside on an edge application server of the edge network device or on an edge application client of the UE. The edge application client on the UE may execute the application that is supported by the application context. The application context may include application data and may include a present state of the application. For example, a user playing an online game may not want to lose a current state of the game, which may include a status of an avatar of the user, a location of the avatar, an inventory of the avatar, an ability of the avatar, and/or the like. If such characteristics of the avatar are not maintained during a mobility event of the UE or during a change in traffic conditions, the user may experience game presentation errors, or the application may fail altogether. If the application is serving a business, the application may affect production or customer relations for the company.

The edge enabler server of the edge network device may handle operations of the edge application server, including making decisions to set up and take down the edge application server, and perform other custodial functions. The edge enabler server may communicate with an edge configuration server, which may configure the edge enabler server and the edge enabler client. When an application changes a point of compute, the application context may need to be transferred to another edge enabler server. The edge enabler server may thus determine whether an application context needs to be relocated to another edge enabler server.

A UE may maintain one or more DNS caches that map fully qualified domain names (FQDNs) to addresses (e.g., Internet Protocol (IP) addresses, such as IPv4 addresses or IPv6 addresses, among other examples). To populate a DNS cache, the UE may transmit a request to resolve a FQDN to a DNS resolver. The DNS resolver may respond to the UE with the address associated with the FQDN, and the UE may store an association between the FQDN and the address in the DNS cache.

In some examples, the UE may use the FQDN to reach edge computing resources of an edge application server at which an application context, associated with an application client resident on the UE, is located. For example, the edge computing resources may be associated with a first edge application server, and a DNS cache of the UE may map the FQDN to an address associated with the first edge application server.

As described above, the application context may be relocated to a second edge application server, for example, due to mobility of the UE, load balancing, a network error, or the like. Accordingly, after the relocation, edge computing resources for the UE are reachable only at a new address associated with the second edge application server and are not reachable at the old address associated with the first edge application server. However, since a DNS cache of the UE may take several seconds or minutes to clear (e.g., according to a cache expiration time), edge computing requests sent by the UE to the old address may fail. In some cases, if the UE attempts to access the resources at the old address, the first edge application server may return a redirect message that indicates the new address for the resources, and the UE may update the DNS cache with the new address. However, this process is slow and consumes resources of the first edge application server, which could otherwise be used for other edge computing requests.

Some techniques and apparatuses described herein enable efficient cache update following relocation of an application context. In some aspects, a UE may store, in a DNS cache, an association between an FQDN and an address (e.g., an IP address) of an edge application server at which an application context, associated with an application client resident on the UE, is located. Accordingly, the UE may make requests to the FQDN for resources of the edge application server. In some aspects, the UE may determine the occurrence of an event (e.g., a handover of the UE) associated with a potential application context relocation, and may perform a DNS cache flush (e.g., with respect to the address of the edge application server) based at least in part on determining the occurrence of the event. Additionally, or alternatively, the UE may receive an indication of an application context relocation, and the UE may perform a DNS cache flush or update (e.g., with respect to the address of the edge application server) based at least in part on receiving the indication. The UE may perform the operations above, and described herein, at an application level of the UE (e.g., using an edge enabler client of the UE) or at a system level of the UE.

Flushing the DNS cache may trigger the UE (e.g., upon a subsequent request to the FQDN) to query a DNS server to obtain a new address of a new edge application server to which the application context is relocated. In this way, the UE may obtain updated DNS information with improved speed (e.g., relative to obtaining updated DNS information upon expiration of the DNS cache), thereby facilitating edge computing with improved performance and minimal service interruption.

As indicated above, FIG. 3 is provided as an example. Other examples may differ from what is described with respect to FIG. 3.

Figure 4:
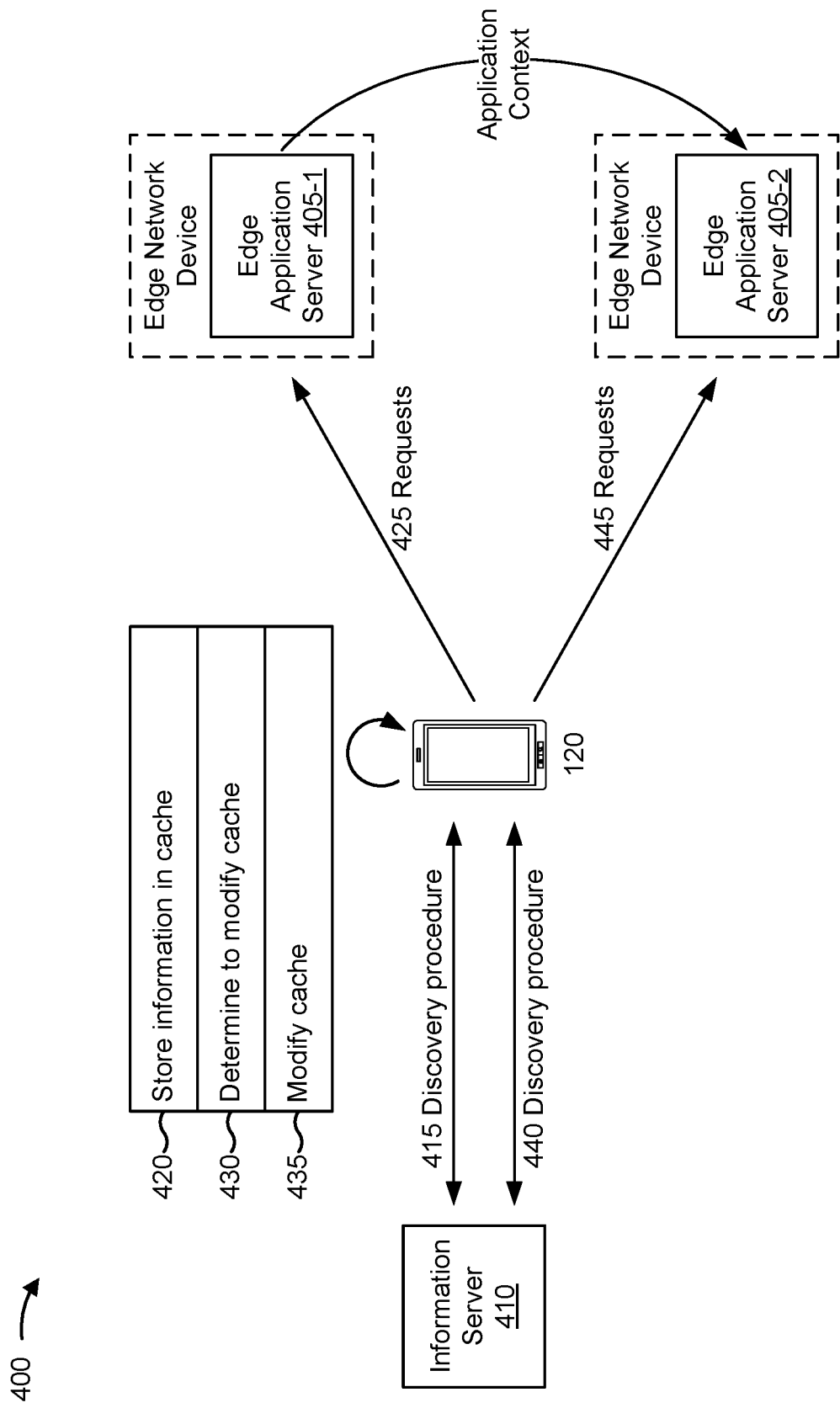
FIG. 4 is a diagram illustrating an example associated with UE cache modification for edge computing, in accordance with the present disclosure.

FIG. 4 is a diagram illustrating an example 400 associated with UE cache modification for edge computing, in accordance with the present disclosure. As shown in FIG. 4, example 400 includes communication between a UE 120, a first edge application server 405-1, a second edge application server 405-2, and an information server 410, such as a DNS server that provides DNS resolution. In some aspects, the edge application servers 405 may be implemented by one or more edge network devices (e.g., edge network devices 130). For example, the edge application servers 405 may be implemented by the same, or different, edge network devices. In some aspects, the UE 120 may communicate with the edge network device(s) and/or the information server 410 via one or more base stations 110. For example, the UE 120 and the one or more base stations 110 may be included in at least one wireless network, such as wireless network 100. Here, the edge network device(s) may be located at an edge of the wireless network(s). For example, a first edge network device (e.g., implementing edge application server 405-1) may be located at a site of a first base station 110 and a second edge network device (e.g., implementing edge application server 405-2) may be located at a site of a second base station 110. As another example, one or more edge network devices (e.g., implementing edge application servers 405) may be located at a site of the same base station 110.

As shown by reference number 415, the UE 120 may perform a discovery procedure (e.g., a DNS based edge application server discovery procedure) to obtain information, such as an address, associated with a domain name (e.g., an FQDN). According to the discovery procedure, the UE 120 may transmit a request to the information server 410. The request may identify the domain name and request information associated with the domain name. The information server 410 may transmit a response to the UE 120 that identifies the information associated with the domain name. For example, the response may indicate an address, such as an IP address, associated with the domain name.

The IP address may be associated with edge computing resources of edge application server 405-1. The edge computing resources may be allocated to the UE 120 for use in connection with an application client resident (e.g., executing) on the UE 120. Accordingly, an application context associated with the application client may be located at the edge application server 405-1.

As shown by reference number 420, the UE 120 may store the information provided by the information server 410 in a cache (e.g., a data structure). For example, the UE 120 may store DNS information (e.g., a DNS record) in a DNS cache. The DNS information may include the domain name (e.g., of the DNS request transmitted by the UE 120) and the IP address (e.g., of the DNS response received by the UE 120), and the DNS information may indicate an association between the domain name and the IP address. Accordingly, as shown by reference number 425, requests made by the UE 120 toward the domain name may be directed to the IP address, associated with the edge application server 405-1, based at least in part on the information stored in the DNS cache.

In some aspects, the UE 120 may store the information (e.g., the DNS information) in a cache (e.g., a DNS cache) associated with the application client. Additionally, or alternatively, the UE 120 may store the information (e.g., the DNS information) in a cache (e.g., a DNS cache) associated with a high-level operating system (HLOS) resident (e.g., executing) on the UE 120. For example, the UE 120 may execute the HLOS on hardware of the UE 120, such as a microcontroller and/or a modem, among other examples. The information stored by the UE 120 in a cache may be associated with an expiration time, after which the UE 120 flushes (e.g., clears) the information from the cache. In some aspects, an expiration time associated with records in an application client cache may be from 60 seconds to 120 seconds, and an expiration time associated with records in an HLOS cache may be from 2 seconds to 2 hours.

As shown by reference number 430, the UE 120 may determine that the UE 120 is to modify (e.g., flush or update) the information in the cache. In some aspects, the UE 120 (e.g., an edge enabler client of the UE 120) may determine to modify the information in the cache based at least in part on receiving a particular message transmitted by a base station 110.

In some aspects, the UE 120 (e.g., the edge enabler client of the UE 120) may detect a handover event of the UE 120. For example, the UE 120 (e.g., the edge enabler client of the UE 120) may receive a message (e.g., from a base station 110) associated with a handover event of the UE 120. The handover event may be associated with a handover of the UE 120 from a first base station 110 to a second base station 110 (e.g., due to movement of the UE 120). The handover event may be associated with a change to an address (e.g., IP address) associated with the UE 120 and a change to an address (e.g., IP address) associated with the domain name (e.g., due to transfer of the application context from edge application server 405-1 to edge application server 405-2).

The UE 120 may determine a potential for the relocation of the application context to the new edge application server 405-2 based at least in part on the message (e.g., the UE 120 may infer that the application context is being relocated based at least in part on detecting the handover event). In some aspects, the message may be a protocol data unit (PDU) session modification command message, for example, that includes a 5G session management cause field that indicates a "reactivation requested" cause (e.g., used for session and service continuity (SSC) mode 3 when relocation is required). Additionally, or alternatively, the message may be a PDU session release command message, for example, that includes a 5G session management cause field that indicates a "reactivation requested" cause (e.g., used for SSC mode 2 when relocation is required). In some aspects, the UE 120 (e.g., the edge enabler client of the UE 120) may detect the handover event by monitoring attention (AT) commands at a modem of the UE 120 (e.g., which may include an indication of the handover event).

In some aspects, the UE 120 may receive a message associated with a transfer of the application context. For example, the edge enabler client of the UE 120 may receive a message indicating the application context transfer from an edge enabler server (e.g., via the EDGE-1 interface). The application context transfer event may be associated with a change to an address associated with the domain name (e.g., due to transfer of the application context from edge application server 405-1 to edge application server 405-2). Accordingly, the UE 120 may determine the relocation of the application context to the new edge application server 405-2 based at least in part on the message. In some aspects, the message may be an edge application server application context transfer message.

The new edge application server 405-2, to which the application context is transferred, and the old edge application server 405-1, from which the application context was transferred, may be implemented by the same or different edge network devices. For example, in a handover event, the old edge application server 405-1 may be implemented by a first edge network device associated with a first base station 110, and the new edge application server 405-2 may be implemented by a second edge network device associated with a second base station 110. As another example, if the application context transfer was due to a network error, such as a server error, the old edge application server 405-1 and the new edge application server 405-2 may be associated with the same edge network device, or different edge network devices associated with the same base station 110. The old edge application server 405-1 and the new edge application server 405-2 may be associated with different information. For example, the old edge application server 405-1 and the new edge application server 405-2 may be associated with different IP addresses.

As shown by reference number 435, the UE 120 (e.g., the edge enabler client of the UE 120) may modify the cache (e.g., the application client cache and/or the HLOS cache) based at least in part on receiving the message associated with the handover event and/or the message associated with the transfer of the application context. In some aspects, the UE 120 (e.g., the edge enabler client of the UE 120) may modify the cache by flushing (e.g., clearing) the cache. For example, the UE 120 may flush the application client cache and/or the HLOS cache. As an example, the edge enabler client of the UE 120 may flush the application client cache via an EDGE-5 interface with the application client and may flush the HLOS cache.

In some aspects, the UE 120 may flush the entire cache so that all records are cleared from the cache. In some other aspects, the UE 120 may flush only the information (e.g., the DNS information) associated with the old edge application server 405-1, at which the application context was originally located, from the cache. The level of granularity at which the UE 120 is to flush the cache may be configured for the UE 120 (e.g., by a base station 110) and/or indicated by the information server 410, as described below.

In some aspects, the UE 120 may selectively flush the cache (e.g., the application client cache and/or the HLOS cache) based at least in part on an indication of whether the UE 120 is to flush the cache in response to receiving a message associated with a handover event. The UE 120 may receive, via a base station 110, the indication from the information server 410 and/or the core network (e.g., a device of the core network implementing a session management function (SMF)). In some aspects, the information server 410 (e.g., a local DNS resolver) may provide the indication of whether the UE 120 is to flush the cache on handover. The information server 410 may provide the indication with the response (e.g., the DNS response) transmitted by the information server 410, as described above. Accordingly, the indication may be specific to the information (e.g., the DNS information) provided with the response. Additionally, or alternatively, the core network (e.g., the SMF) may provide (e.g., via a base station 110) the indication of whether the UE 120 is to flush the cache on handover. Here, the indication may be based at least in part on a mobility capability of the UE 120. For example, if the UE 120 is capable of mobility, the indication may indicate that the UE 120 is to flush the cache on handover.

In some aspects, the UE 120 (e.g., the edge enabler client of the UE 120) may modify the cache by updating the cache. For example, the UE 120 may update the application client cache and/or the HLOS cache. As an example, the edge enabler client of the UE 120 may update the applicant client cache or the HLOS cache by providing (e.g., via messages) new information (e.g., the domain name and a new IP address), associated with the new edge application server 405-2 to the application client or the HLOS. In some aspects, the UE 120 (e.g., the edge enabler client of the UE 120) may perform an edge application server discovery procedure in response to receiving a message associated with a transfer of the application context. The UE 120 may obtain the new information (e.g., a new IP address) associated with the new edge application server 405-2 by performing the edge application server discovery procedure. The edge application server discovery procedure may include a non-DNS based edge application server discovery procedure performed between the edge enabler client of the UE 120, the edge configuration server, and one or more edge enabler servers.

As shown by reference number 440, if the UE 120 flushed the cache, then the UE 120 may perform another discovery procedure (e.g., another DNS based edge application server discovery procedure) to obtain the new information associated with the domain name (e.g., an FQDN), as described above with respect to reference number 415. For example, the UE 120 may transmit a request to the information server 410, and receive a response that identifies the new information, such as an IP address, associated with the domain name. Here, the new information may be associated with the new edge application server 405-2 to which the application context was relocated. The UE 120 may store the new information in the cache (e.g., the DNS cache), as described above. Accordingly, as shown by reference number 445, requests made by the UE 120 to the domain name may be directed to the new IP address, associated with the new edge application server 405-2, based at least in part on the new information stored in the DNS cache.

In this way, traffic for the application client may be routed to the new IP address, associated with the new edge application server 405-2, with reduced delay relative to flushing the cache at the expiration time. Accordingly, the UE 120 may use edge computing resources with improved responsiveness to changes at the network edge, thereby avoiding seconds or minutes of degraded performance or service interruption. In addition, the techniques and apparatuses described herein may enable optimized termination of edge application servers from which an application context is relocated. For example, according to the techniques and apparatuses described herein, traffic may cease to such old edge application servers relatively faster, thereby permitting faster termination of the edge application servers and efficient release of associated edge computing resources.

As indicated above, FIG. 4 is provided as an example. Other examples may differ from what is described with respect to FIG. 4.

Figure 5:
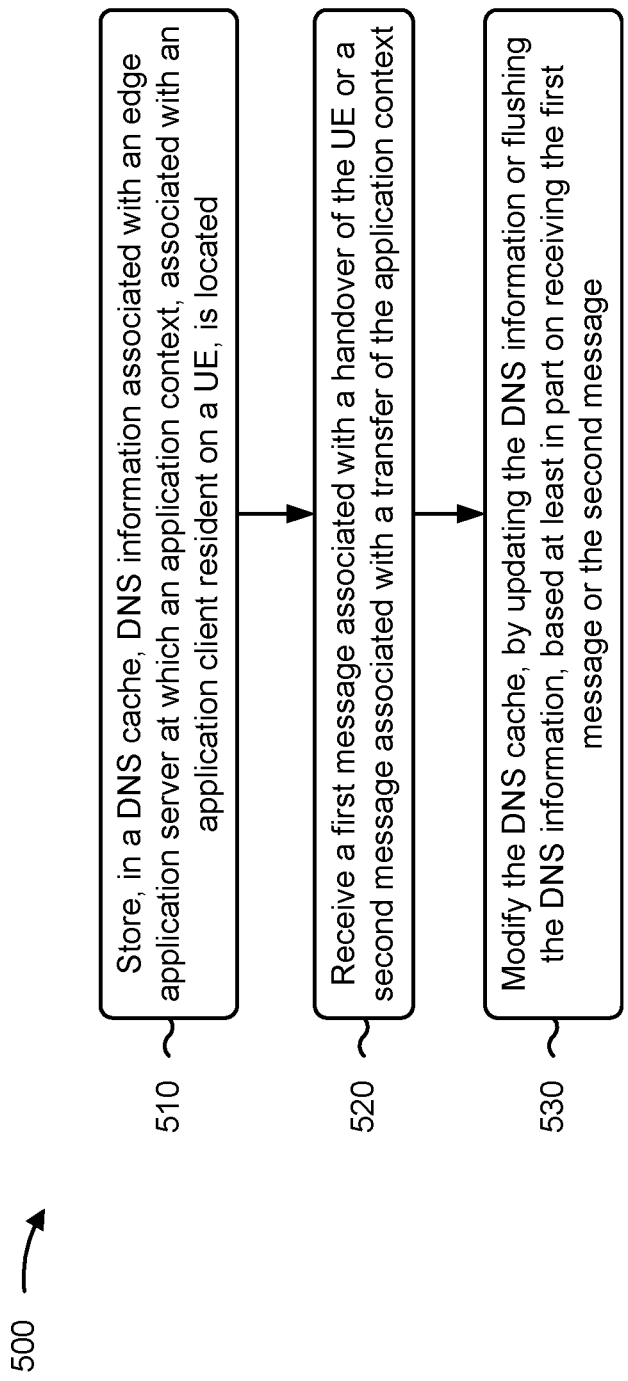
FIG. 5 is a diagram illustrating an example process associated with UE cache modification for edge computing, in accordance with the present disclosure.

FIG. 5 is a diagram illustrating an example process 500 performed, for example, by a UE, in accordance with the present disclosure. Example process 500 is an example where the UE (e.g., UE 120) performs operations associated with UE cache modification for edge computing.

As shown in FIG. 5, in some aspects, process 500 may include storing, in a DNS cache, DNS information associated with an edge application server at which an application context, associated with an application client resident on a UE, is located (block 510). For example, the UE (e.g., using caching component 608, depicted in FIG. 6) may store, in a DNS cache, DNS information associated with an edge application server at which an application context, associated with an application client resident on the UE, is located, as described above.

As further shown in FIG. 5, in some aspects, process 500 may include receiving a first message associated with a handover of the UE or a second message associated with a transfer of the application context (block 520). For example, the UE (e.g., using reception component 602, depicted in FIG. 6) may receive a first message associated with a handover of the UE or a second message associated with a transfer of the application context, as described above.

As further shown in FIG. 5, in some aspects, process 500 may include modifying the DNS cache, by updating the DNS information or flushing the DNS information, based at least in part on receiving the first message or the second message (block 530). For example, the UE (e.g., using caching component 608, depicted in FIG. 6) may modify the DNS cache, by updating the DNS information or flushing the DNS information, based at least in part on receiving the first message or the second message, as described above.

Process 500 may include additional aspects, such as any single aspect or any combination of aspects described below and/or in connection with one or more other processes described elsewhere herein.

In a first aspect, process 500 includes performing a DNS based edge application server discovery procedure to obtain the DNS information associated with the edge application server.

In a second aspect, alone or in combination with the first aspect, process 500 includes performing, based at least in part on flushing the DNS cache, a DNS based edge application server discovery procedure for a new edge application server at which the application context is located.

In a third aspect, alone or in combination with one or more of the first and second aspects, the DNS information includes at least one of a fully qualified domain name and an address associated with the edge application server.

In a fourth aspect, alone or in combination with one or more of the first through third aspects, the first message is a PDU session modification command message identifying a reactivation requested cause or a PDU session release command message identifying a reactivation requested cause.

In a fifth aspect, alone or in combination with one or more of the first through fourth aspects, the second message is an edge application server application context transfer message.

In a sixth aspect, alone or in combination with one or more of the first through fifth aspects, the DNS cache is at least one of a first DNS cache associated the application client or a second DNS cache associated with a high-level operating system resident on the UE.

In a seventh aspect, alone or in combination with one or more of the first through sixth aspects, process 500 includes receiving an indication of whether the UE is to flush the DNS cache in response to receiving a message associated with a handover of the UE.

In an eighth aspect, alone or in combination with one or more of the first through seventh aspects, process 500 includes performing, in response to receiving the second message, an edge application server discovery procedure to obtain an address of a new edge application server at which the application context is located.

In a ninth aspect, alone or in combination with one or more of the first through eighth aspects, modifying the DNS cache comprises updating the DNS information in the DNS cache using the address of the new edge application server.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
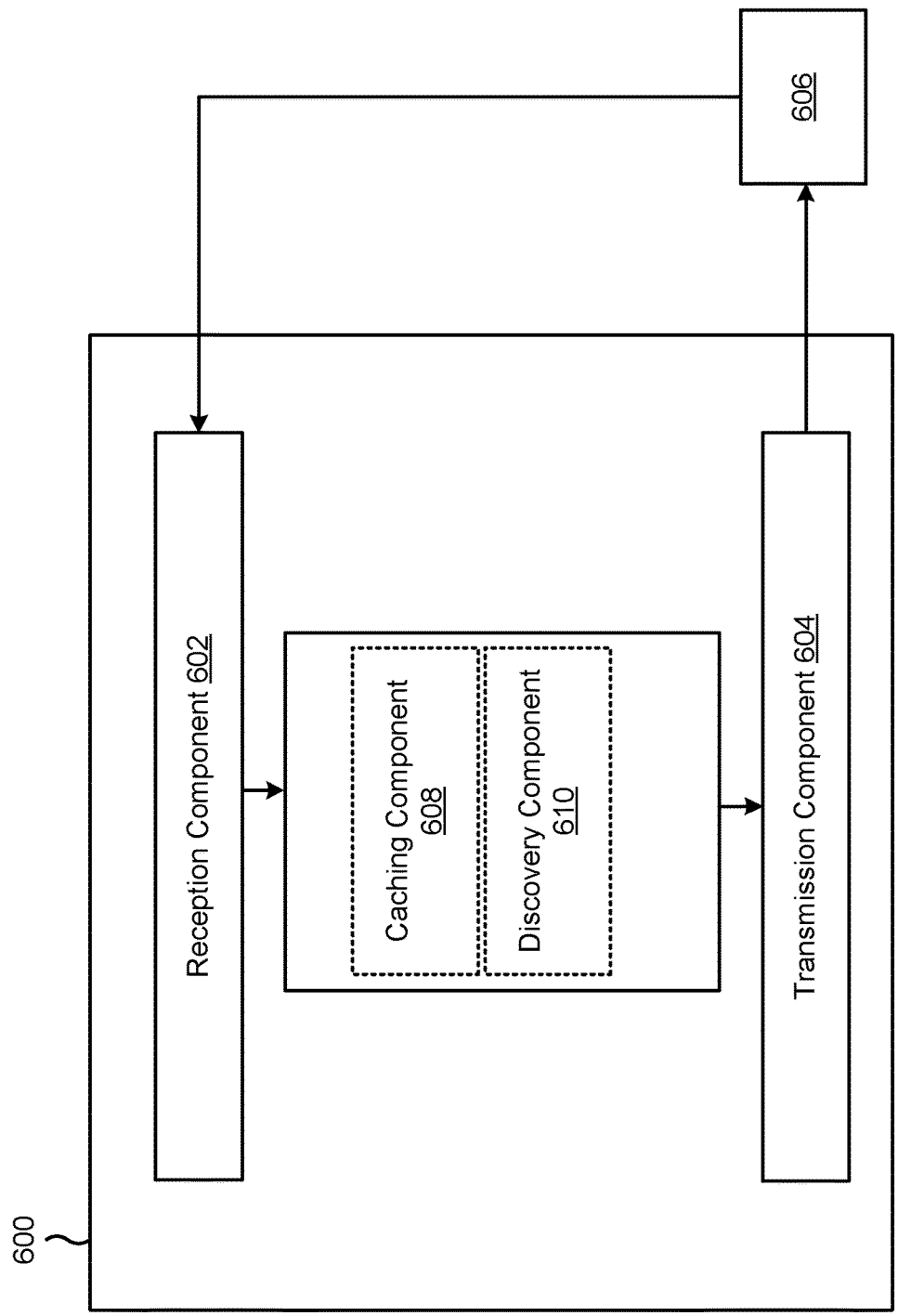
FIG. 6 is a diagram illustrating an example apparatus for wireless communication, in accordance with the present disclosure.

FIG. 6 is a diagram illustrating an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a caching component 608 or a discovery component 610, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The caching component 608 may store, in a DNS cache, DNS information associated with an edge application server at which an application context, associated with an application client resident on the UE, is located. In some aspects, the caching component 608 may include a controller/processor, a memory, or a combination thereof, of the UE described above in connection with FIG. 2. The reception component 602 may receive a first message associated with a handover of the UE or a second message associated with a transfer of the application context. The caching component 608 may modify the DNS cache, by updating the DNS information or flushing the DNS information, based at least in part on receiving the first message or the second message.

The discovery component 610 may perform a DNS based edge application server discovery procedure to obtain the DNS information associated with the edge application server. The discovery component 610 may perform, based at least in part on flushing the DNS cache, a DNS based edge application server discovery procedure for a new edge application server at which the application context is located. In some aspects, the discovery component 610 may include one or more antennas, a modulator, a transmit MIMO processor, a transmit processor, a demodulator, a MIMO detector, a receive processor, a controller/processor, a memory, or a combination thereof, of the UE described above in connection with FIG. 2.

The reception component 602 may receive an indication of whether the UE is to flush the DNS cache in response to receiving a message associated with a handover of the UE.

The discovery component 610 may perform, in response to receiving the second message, an edge application server discovery procedure to obtain an address of a new edge application server at which the application context is located.

The quantity and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: storing, in a domain name system (DNS) cache, DNS information associated with an edge application server at which an application context, associated with an application client resident on the UE, is located; receiving a first message associated with a handover of the UE or a second message associated with a transfer of the application context; and modifying the DNS cache, by updating the DNS information or flushing the DNS information, based at least in part on receiving the first message or the second message.

Aspect 2: The method of Aspect 1, further comprising: performing a DNS based edge application server discovery procedure to obtain the DNS information associated with the edge application server.

Aspect 3: The method of any of Aspects 1-2, further comprising: performing, based at least in part on flushing the DNS cache, a DNS based edge application server discovery procedure for a new edge application server at which the application context is located.

Aspect 4: The method of any of Aspects 1-3, wherein the DNS information includes at least one of a fully qualified domain name and an address associated with the edge application server.

Aspect 5: The method of any of Aspects 1-4, wherein the first message is a protocol data unit (PDU) session modification command message identifying a reactivation requested cause or a PDU session release command message identifying a reactivation requested cause.

Aspect 6: The method of any of Aspects 1-5, wherein the second message is an edge application server application context transfer message.

Aspect 7: The method of any of Aspects 1-6, wherein the DNS cache is at least one of a first DNS cache associated the application client or a second DNS cache associated with a high-level operating system resident on the UE.

Aspect 8: The method of any of Aspects 1-7, further comprising: receiving an indication of whether the UE is to flush the DNS cache in response to receiving a message associated with a handover of the UE.

Aspect 9: The method of any of Aspects 1-8, further comprising: performing, in response to receiving the second message, an edge application server discovery procedure to obtain an address of a new edge application server at which the application context is located.

Aspect 10: The method of Aspect 9, wherein modifying the DNS cache comprises: updating the DNS information in the DNS cache using the address of the new edge application server.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   storing, in a domain name system (DNS) cache, DNS information associated with an edge application server at which an application context, associated with an application client resident on the UE, is located, the DNS information comprising a domain name associated with the edge application server;
   receiving a message indicating:
      an update to the edge application server at which the application context is located,
      an update of an Internet Protocol (IP) address associated with the domain name, and
      a level of granularity at which the UE is to flush the DNS cache; and
   modifying the DNS cache, by updating the DNS information or flushing the DNS information, based at least in part on receiving the message.

2. The method of claim 1, further comprising:
   performing a DNS based edge application server discovery procedure to obtain the DNS information associated with the edge application server.

3. The method of claim 1, further comprising:
   performing, based at least in part on flushing the DNS cache, a DNS based edge application server discovery procedure for a new edge application server at which the application context is located.

4. The method of claim 1, wherein the DNS information includes an address associated with the edge application server.

5. The method of claim 1, wherein the message is a protocol data unit (PDU) session modification command message or a PDU session release command message.

6. The method of claim 1, wherein the DNS cache is at least one of a first DNS cache associated with the application client or a second DNS cache associated with a high-level operating system resident on the UE.

7. The method of claim 1, wherein the level of granularity indicates that the UE is to flush all information in the DNS cache in response to receiving the message.

8. The method of claim 1, further comprising:
   performing, in response to receiving the message, an edge application server discovery procedure to obtain an address of a new edge application server at which the application context is located.

9. The method of claim 8, wherein modifying the DNS cache comprises:
   updating the DNS information in the DNS cache using the address of the new edge application server.

10. A user equipment (UE) for wireless communication, comprising:
    one or more memories; and
    one or more processors coupled to the one or more memories, which are configured, individually or in any combination, to:
       store, in a domain name system (DNS) cache, DNS information associated with an edge application server at which an application context, associated with an application client resident on the UE, is located, the DNS information comprising a domain name associated with the edge application server;
       receive a message indicating:
          an update to the edge application server at which the application context is located,
          an update of an Internet Protocol (IP) address associated with the domain name, and
          a level of granularity at which the UE is to flush the DNS cache; and
       modify the DNS cache, by updating the DNS information or flushing the DNS information, based at least in part on receiving the message.

11. The UE of claim 10, wherein the one or more processors are further configured to:
    perform a DNS based edge application server discovery procedure to obtain the DNS information associated with the edge application server.

12. The UE of claim 10, wherein the one or more processors are further configured to:
    perform, based at least in part on flushing the DNS cache, a DNS based edge application server discovery procedure for a new edge application server at which the application context is located.

13. The UE of claim 10, wherein the DNS information includes an address associated with the edge application server.

14. The UE of claim 10, wherein the message is a protocol data unit (PDU) session modification command message or a PDU session release command message.

15. The UE of claim 10, wherein the DNS cache is at least one of a first DNS cache associated with the application client or a second DNS cache associated with a high-level operating system resident on the UE.

16. The UE of claim 10, wherein the level of granularity indicates that the UE is to flush all information in the DNS cache in response to receiving the message.

17. The UE of claim 10, wherein the one or more processors are further configured to:

perform, in response to receiving the message, an edge application server discovery procedure to obtain an address of a new edge application server at which the application context is located.

18. The UE of claim 17, wherein the one or more processors, when modifying the DNS cache, are configured to:
update the DNS information in the DNS cache using the address of the new edge application server.

19. A non-transitory computer-readable medium storing a set of instructions for wireless communication, the set of instructions comprising:
one or more instructions that, when executed by one or more processors of a user equipment (UE), cause the UE to:
store, in a domain name system (DNS) cache, DNS information associated with an edge application server at which an application context, associated with an application client resident on the UE, is located, the DNS information comprising a domain name associated with the edge application server;
receive a message indicating:
an update to the edge application server at which the application context is located,
an update of an Internet Protocol (IP) address associated with the domain name, and
a level of granularity at which the UE is to flush the DNS cache; and
modify the DNS cache, by updating the DNS information or flushing the DNS information, based at least in part on receiving the message.

20. The non-transitory computer-readable medium of claim 19, wherein the one or more instructions further cause the UE to:
perform a DNS based edge application server discovery procedure to obtain the DNS information associated with the edge application server.

21. The non-transitory computer-readable medium of claim 19, wherein the one or more instructions further cause the UE to:
perform, based at least in part on flushing the DNS cache, a DNS based edge application server discovery procedure for a new edge application server at which the application context is located.

22. The non-transitory computer-readable medium of claim 19, wherein the message is a protocol data unit (PDU) session modification command message or a PDU session release command message.

23. The non-transitory computer-readable medium of claim 19, wherein the DNS cache is at least one of a first DNS cache associated with the application client or a second DNS cache associated with a high-level operating system resident on the UE.

24. The non-transitory computer-readable medium of claim 19, wherein the DNS information includes an address associated with the edge application server.

25. The non-transitory computer-readable medium of claim 19, wherein the one or more instructions further cause the UE to:
perform, in response to receiving the message, an edge application server discovery procedure to obtain an address of a new edge application server at which the application context is located.

26. An apparatus for wireless communication, comprising:
means for storing, in a domain name system (DNS) cache, DNS information associated with an edge application server at which an application context, associated with an application client resident on the apparatus, is located, the DNS information comprising a domain name associated with the edge application server;
means for receiving a message indicating:
an update to the edge application server at which the application context is located,
an update of an Internet Protocol (IP) address associated with the domain name, and
a level of granularity at which the apparatus is to flush the DNS cache; and
means for modifying the DNS cache, by updating the DNS information or flushing the DNS information, based at least in part on receiving the message.

27. The apparatus of claim 26, further comprising:
means for performing a DNS based edge application server discovery procedure to obtain the DNS information associated with the edge application server.

28. The apparatus of claim 26, further comprising:
means for performing, based at least in part on flushing the DNS cache, a DNS based edge application server discovery procedure for a new edge application server at which the application context is located.

29. The apparatus of claim 26, wherein the message is a protocol data unit (PDU) session modification command message or a PDU session release command message.

30. The apparatus of claim 26, wherein the DNS cache is at least one of a first DNS cache associated with the application client or a second DNS cache associated with a high-level operating system resident on the apparatus.

* * * * *